US006931883B2

(12) United States Patent
Bourne et al.

(10) Patent No.: US 6,931,883 B2
(45) Date of Patent: Aug. 23, 2005

(54) TWO STAGE INDIRECT EVAPORATIVE COOLING SYSTEM

(75) Inventors: Richard C. Bourne, Davis, CA (US);
Brian E. Lee, Monterey, CA (US);
Duncan Callaway, Oakland, CA (US)

(73) Assignee: Davis Energy Group, Inc., Davis, CA (US)

( * ) Notice: Subject to any disclaimer, the term of this patent is extended or adjusted under 35 U.S.C. 154(b) by 24 days.

(21) Appl. No.: 10/737,823

(22) Filed: Dec. 18, 2003

(65) Prior Publication Data

US 2005/0132738 A1 Jun. 23, 2005

(51) Int. Cl.[7] ................................................. F28D 5/00

(52) U.S. Cl. ......................................................... 62/314

(58) Field of Search ........................... 62/314, 310, 311, 62/121; 261/DIG. 3, 158

(56) References Cited

U.S. PATENT DOCUMENTS

| 4,380,910 A | * | 4/1983 | Hood et al. ..................... 62/91 |
| 5,212,956 A | * | 5/1993 | Tsimerman ..................... 62/94 |
| 5,664,433 A | | 9/1997 | Bourne et al. |
| 5,724,828 A | * | 3/1998 | Korenic ....................... 62/305 |
| 6,779,351 B2 | * | 8/2004 | Maisotsenko et al. ......... 62/121 |

* cited by examiner

*Primary Examiner*—Chen Wen Jiang
(74) *Attorney, Agent, or Firm*—Oliff & Berridge, PLC

(57) ABSTRACT

A two stage indirect evaporative cooler that moves air from a blower mounted above the unit, vertically downward into dry air passages in an indirect stage and turns the air flow horizontally before leaving the indirect stage. After leaving the dry passages, a major air portion travels into the direct stage and the remainder of the air is induced by a pressure drop in the direct stage to turn 180° and returns horizontally through wet passages in the indirect stage and out of the unit as exhaust air.

41 Claims, 3 Drawing Sheets

TWO STAGE INDIRECT EVAPORATIVE COOLING SYSTEM

This invention was made with State of California support under California Energy Commission contract number 500-98-022. The Energy Commission has certain rights to this invention.

BACKGROUND OF THE INVENTION

1. Field of Invention

This invention relates to improvements in indirect evaporative cooling technology, and particularly to indirect/direct evaporative cooling devices used in conditioning air.

2. Description of Related Art

Two-stage evaporative coolers, also known as indirect/direct evaporative coolers (IDEC's), have enormous potential to provide indoor comfort and simultaneously reduce energy consumption by replacing traditional vapor compression air conditioning systems in dry to moderately dry climates. IDEC units can have more cooling capacity than traditional single stage (i.e., direct) evaporative coolers, and add less moisture to the conditioned space. IDEC units do not use a compressor and are therefore significantly more energy efficient than traditional air conditioning systems. IDEC's combination of energy efficiency, high cooling capacity, and relatively little moisture addition promises significant societal benefit by mitigating the environmental damage associated with conventional air conditioning systems. IDEC units are potentially very effective at reducing electricity use during summer afternoon hours, when most utilities face peak demand.

Modern indirect evaporative cooling is typically accomplished by passing air through a system of thin parallel heat exchange plates with alternating dry and wet passages. A first airstream is passed through the dry passages; simultaneously, a second airstream is passed through the parallel wet passages. Water is supplied to the surfaces of the heat exchange plates that directly contact the second airstream in the wet passages, thereby evaporatively cooling the plates. The first airstream is cooled by contact with the dry surfaces of the cooled plates, as heat is conducted from the warmer dry side to the evaporatively-cooled wet side. In a typical IDEC design, the first airstream is further cooled, downstream of the indirect stage, in a direct evaporative cooling stage before entering a building as cool supply air.

The predecessor design disclosed in U.S. Pat. No. 5,664,433 to Bourne et al., incorporated herein in its entirety, describes a two-stage evaporative cooler with features that yield a small "footprint", which facilitates wall mount applications and other installations where vertical space is obtainable but horizontal space is limited. A single air mover is positioned above or beneath the indirect stage, supplying air to the indirect stage in a vertical direction. This predecessor design includes features located in the flow path that split the airstream into one portion that makes two 90° degree turns to travel vertically through the wet passages, and another portion that turns 90° to travel horizontally through the dry passages of the indirect stage and then through the direct stage. The "footprint" can be small in conjunction with tall and narrow indirect and direct stages.

SUMMARY OF THE INVENTION

The two-stage evaporative cooler disclosed in U.S. Pat. No. 5,664,433 (the '433 patent) includes several limitations. The first of these limitations results from discharging secondary air through the top or bottom of the unit, as it must with vertical airflow in the wet passages. If the blower is atop the unit and secondary (wet passage) air exits beneath the plates, the vertical height must be increased to allow air to exit above the water sump. In the design disclosed in the '433 patent, the exit air may create maintenance problems by carrying moisture droplets out of the unit. Alternatively, if the blower is below the plates and air exits the top of the wet passages, (as in the preferred design disclosed in the '433 patent), outdoor debris can enter the wet passages and increase maintenance requirements. This configuration is also vulnerable to damaging water leakage into the air mover motor and electronics.

A second limitation of the IDEC disclosed in the '433 patent is the use of crossflow design for the indirect heat exchanger. It is known in the art that a counterflow pattern is generally superior to crossflow for heat exchange effectiveness. But, like most prior IDEC designs, the '433 patent takes advantage of the ease of separating the primary and secondary airstreams in crossflow heat exchanger design.

A third limitation of the '433 patent is the lengthy secondary flow path. With current energy economics, the most practical IDEC designs use indirect plates whose height is approximately three times their width, and with primary air flow rate roughly three times the secondary air flow rate. In a crossflow heat exchange pattern, the secondary flow path is then roughly three times as long as the primary air flow path, with high pressure drop if all plates are equally spaced. The wet passages may be more widely spaced, but for a fixed IDEC width this approach reduces the dry passage flow area, and results in high pressure drop through the wet passages. This high pressure drop increases the energy requirements of the air mover.

A fourth limitation of the '433 patent is the use of a cabinet, blower housing, and sump fabricated from multiple complex metal panels. The metal components are expensive to manufacture and have been subject to corrosion that shortens unit life and adversely affects appearance. Placement of the blower and controls below the water sump has exacerbated maintenance issues.

The present invention is directed to improvements to indirect/direct evaporative cooling units. These improvements enhance reliability, efficiency, manufacturability and capacity. The present invention is designed to provide improved cooling and ventilation to residential and small commercial buildings, and comprises: an evaporative section that includes direct evaporative media and a plate-type indirect evaporative heat exchanger; a water reservoir, pump, and water distribution system that capture and re-circulate water within the evaporative section; automatic systems that refill and drain the water sump; an air mover that operates upstream of the evaporative section; electrical controls; and a cabinet that houses the unit.

One exemplary embodiment of the indirect/direct evaporative cooling system according to the invention includes an improved airflow configuration that permits the blower to be mounted above the unit, wet passage air to be exhausted out the back of the unit, and primary and secondary air to travel in counterflow across much of the plate surface area. In the exemplary embodiment, air discharged by the air mover is not split into two airstreams before entering the dry passages of the indirect stage. Rather, all discharge air travels vertically downward into the dry passages of the indirect stage, and then, within the plate system, turns to flow horizontally before leaving the dry passages. After leaving the dry passages, a major air portion travels straight ahead into the direct stage, and the remainder is induced by a pressure drop in the direct stage to turn 180° and return horizontally through the wet passages of the indirect stage and out the back of the unit as exhaust air.

In accordance with a preferred exemplary embodiment of the invention, the cabinet, blower housing, and sump are integrally formed components of a single plastic part, molded with many features that would otherwise be fabricated as individual parts.

In one preferred exemplary embodiment, the indirect heat exchanger consists of an assembly of plastic plates with features that enable the plates to interlock, help divert the airflow direction from vertical to horizontal, facilitate uniform airflow, and provide precise spacing between adjacent plate walls.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

A preferred embodiment of the present invention is described hereafter, with reference to the drawings.

Figure 1:
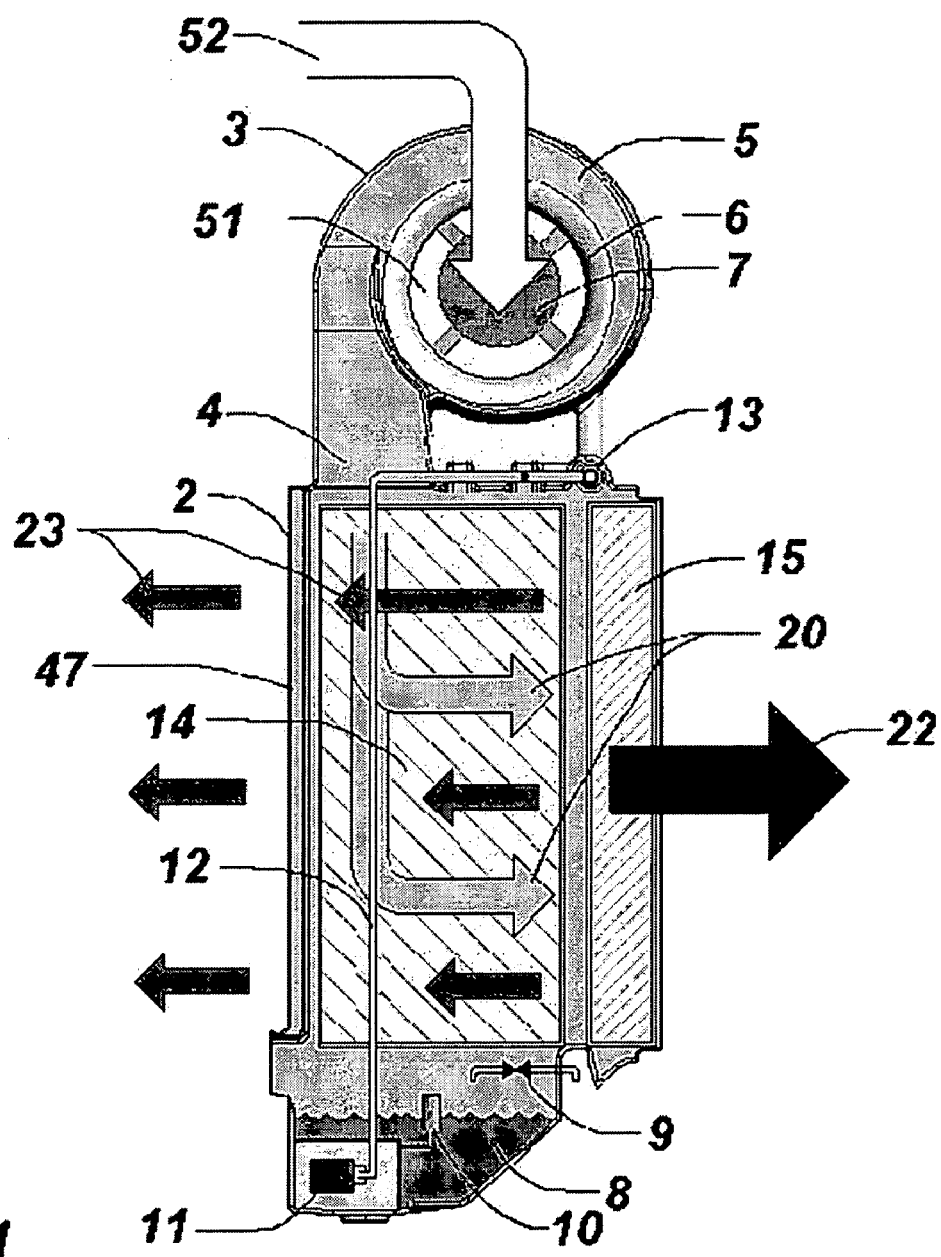
FIG. 1 is a vertical cross-sectional view of the indirect/direct evaporative cooling unit according to a preferred embodiment of the present invention.

FIG. 1 is a vertical cross-sectional view of the indirect/direct evaporative cooling (IDEC) unit according to an exemplary embodiment of the present invention. FIG. 1 also includes schematic arrows showing air flows.

As shown in FIG. 1, the IDEC unit 1 includes a cabinet 2, having an air mover 3 that discharges air through a flared discharge chute 4. In a preferred exemplary embodiment, the air mover 3 is a centrifugal blower comprising a housing 5, a blower wheel 6, and an electric motor 7. The motor 7 may operate at speeds that are continuously variable such that only a precise amount of air necessary to meet the current cooling load is provided, thereby increasing the overall efficiency of the unit 1 by reducing the amount of energy required by the air mover 3. In one preferred embodiment, an electronically commutated motor (ECM) drives the air mover 3.

The water distribution route is described in reference to FIG. 1. Water is introduced to the reservoir 8 via a fill valve 9. In an exemplary embodiment, the water level in the reservoir may be electronically controlled based on the position of a float switch 10 disposed in the reservoir 8. A pump 11 circulates water from the reservoir 8 through a distribution pipe 12 to the top of the unit 1. In an exemplary embodiment the pump 11 is not a submersible pump, but instead is located in a cabinet recess outside the sump. This location is preferred for access and also because highly efficient submersible pumps are not currently available. The water from the pipe 12 enters a distribution manifold 13 that apportions the water to the indirect cooling stage 14 and the direct cooling stage 15. Water flows downward by gravity through both stages 14, 15 and then back to the water reservoir 8. As the water flows downward, it is distributed through the direct cooling stage 15 and the surfaces of the wet passages of the indirect cooling stage 14. Water in the indirect cooling stage 14 and the direct cooling stage 15 is cooled evaporatively by airstreams forced by the air mover 3. In an exemplary embodiment, water from the pump 11 is continuously recirculated during operation of the unit 1.

As shown in FIG. 1, fresh air 52 enters the air mover 3 through air inlets 51. The fresh air is moved through the air mover 3 by the blower wheel 6 driven by the electric motor 7. The air exits the housing 5 of the air mover 3 through the flared discharge chute 4 and enters indirect cooling stage 14 housed in the cabinet 2. The air travels vertically downward and then horizontally through the indirect stage 14 as airstream 20 in the dry passages 17 (FIG. 2) of the indirect stage 14. After leaving the indirect stage 14, a substantial portion of the air travels through the direct stage 15 as supply airstream 22. The remainder of the air is induced by pressure drop in the direct stage 15 to turn 180° and return horizontally through the wet passages 18 (FIG. 2) of the indirect stage 14 and out of the unit 1 through back side 47 as exhaust airstream 23.

Figure 2:
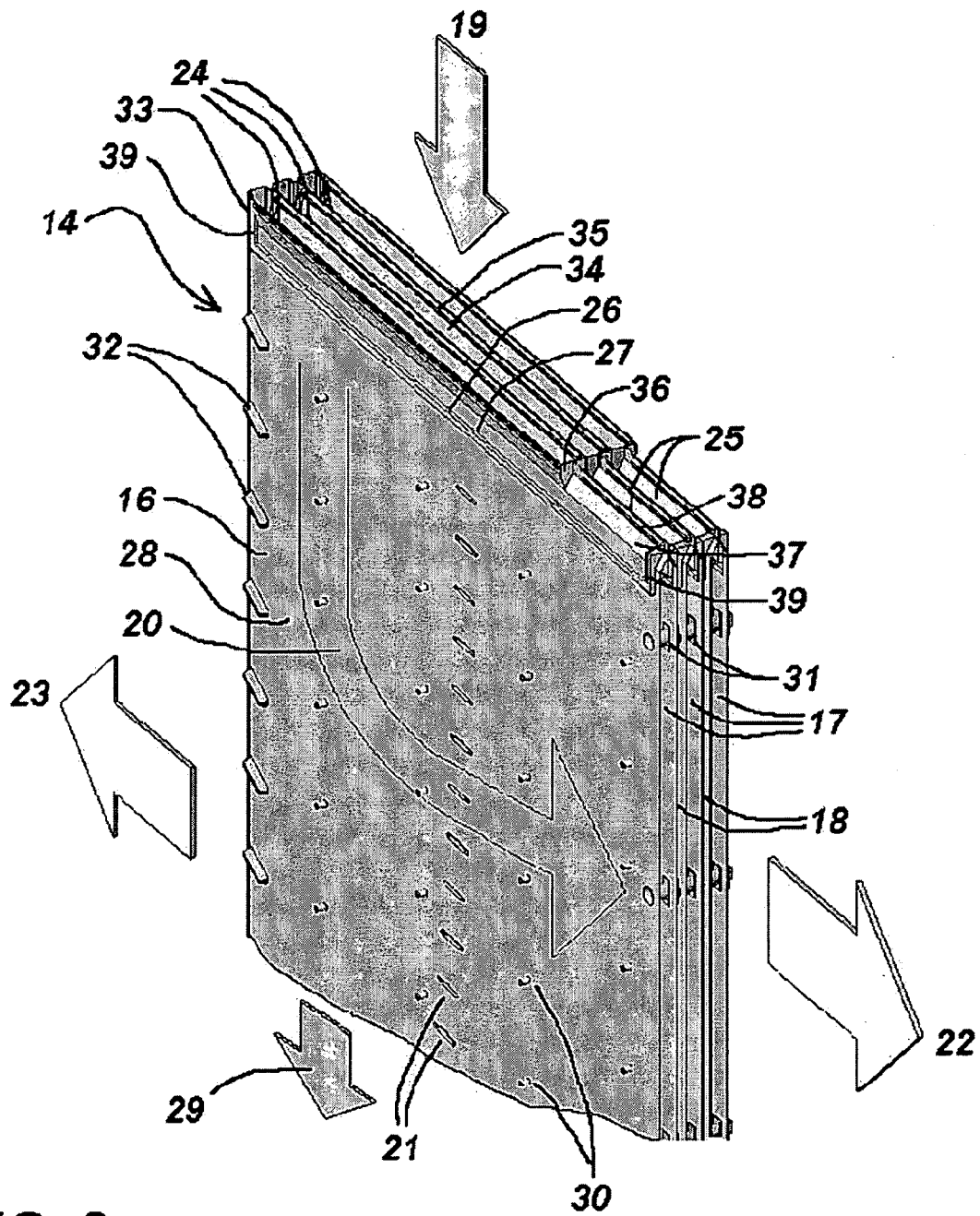
FIG. 2 is an isometric view of the indirect stage plates showing both air and water flow patterns according to a preferred embodiment of the present invention.

FIG. 2 is an isometric view of the indirect cooling stage plates showing both air and water flow patterns according to a preferred exemplary embodiment of the present invention.

As shown in FIG. 2, the indirect cooling stage 14 uses parallel heat exchange plates 16 to separate dry passages 17 and wet passages 18. Air leaving the air mover 3 through the discharge chute 4 enters the indirect cooling stage 14. Blower air 19 travels vertically downward as it leaves the blower discharge chute 4 (FIG. 1) and enters dry passages 17 through dry passage inlets 24. The dry passages are formed between exchange plates 16. The blower air 19 is collectively referred to as an air-stream 20 that divides among the dry passages 17. The heat exchange plates 16 are formed such that wet passages 18 formed between the exchange plates 16 are closed where they face the blower outlet 4 so that blower air 19 leaving the air mover 3 via the chute 4 does not enter the wet passages 18. As the air stream 20 passes through the dry passages 17, the air stream 20 is turned to flow horizontally. The air stream 20 is assisted in the transition to horizontal flow by air diverters 21.

Upon exiting the dry passages 17, the air stream 20 divides into two airstreams 22, 23. Air stream 22 continues in the same horizontal path as the air stream 20 and enters the direct cooling stage 15. The other air stream 23 turns 180° due to a relative pressure drop between ambient building pressure and the pressure within the wet passages 18. The air stream 23 enters the wet passages 18 between the exchange plates 16 disposed in the indirect stage 14. The relative volumetric flow of airstreams 22 and 23 is a function of the relative pressure drops of the direct cooling stage 15, the wet passages 18, any gap between the two stages 14, 15, as well as other components downstream of the wet passages 18 and the direct cooling stage 15.

The direct evaporative cooling stage 15 includes an evaporative medium (not shown) such as, for example, a wetted pad or permeable membrane to evaporatively cool the air stream 22. A suitable high quality evaporative medium is "CELdec", available from Munters Corporation.

Water flow can be further described in reference to FIG. 2. The dry passage inlets 24 are located beneath the blower discharge chute 4. The heat exchange plates 16 taper toward one another to close the wet passages 18 to prevent blower air 19 leaving the chute 4 from entering the wet passages 18. Water feed openings 25 to the wet passages 18 are located beneath the distribution manifold 13 (FIG. 1). Water leaving the distribution manifold 13 enters the water feed openings 25. Directly beneath each opening 25 is a semi-permeable barrier 26 that forms a horizontal trough 27 extending above the entire length of each wet passage 18 and spanning between each pair of heat exchange plates 16 facing the wet passages 18. Vertical barrier segments 39 prevent water from spilling out the ends of the troughs 27. In an exemplary embodiment, the semi-permeable barrier 26 is designed such that, with sufficient water supply from distribution manifold 13, water will flow the length of each wet passage 18 above the barrier 26. In one preferred embodiment, each trough 27 is formed by mating "mirror-image" barriers 26 projecting from adjacent plate surfaces.

Water permeates slowly downward through barrier 26 and onto the "wet side" heat exchange plate surfaces 28, flowing downward as a flattened water stream 29 across the entire plate surface 28. The surfaces 28 may be treated mechanically, chemically, or with a flocking material to facilitate uniform spreading of water stream 29 across the surfaces 28.

In a preferred exemplary embodiment, a polystyrene plate having a polyester flocking disposed on the plate surfaces may be used. In another embodiment, rayon may be used as an adjunct in plate wetting. In another embodiment (not shown) a "wick strip" is inserted in the bottom of troughs 27 to assist in wetting. Although the exemplary embodiments provide specific examples, the invention contemplates any other existing or later developed means to facilitate wetting of the plate surfaces.

The thermodynamic heat exchange process is as follows: The air stream 23 and the water stream 29 are both evaporatively cooled when they meet in the wet passages 18. This process is most effective when the water stream 29 wets the entire surfaces of the wet side plate walls 28. The resulting temperature difference between the water stream 29 and the dry air stream 20 in the dry passages 17 causes a transfer of heat from the dry air stream 20, through the walls of the heat exchange plates 16, and into the water stream 29. Because the air stream 20 is cooled indirectly, its wet bulb temperature is reduced as it travels through the dry passages 17, increasing the evaporative capacity of air streams 22 and 23 as they enter the direct stage 15 and the wet passages 18, respectively.

In a preferred exemplary embodiment of the invention, the heat exchange plates 16 are formed on an inline thermoforming apparatus where a continuous roll of thin plastic material is formed into plates in a rapid, automated process. Features such as spacers 30, snaps 31, air diverters 21 and 32, protrusions for the semi-permeable barrier 26, and flared openings to the wet passages 24 and dry passages 25 can be raised or lowered from the original plane of the plates 28 during the molding process. The spacers 30 project into the wet passages 18 to maintain spacing between the plates 16 to resist the pressure created by the air stream 20 in the dry passages 17 that might otherwise fully or partially close the wet passages 18. The snaps 31 protrude into the dry passages 17 between the plates 16 and provide an interlock that secures the adjacent plates 16 to each other. As described above, the function of the air diverters 21 is to assist the air stream 20 in its transition from vertical flow to horizontal flow. In an exemplary embodiment, the diverters 21 are preferably designed as small airfoils to minimize pressure drop. The air diverters 32 preferably project fully across the wet passages 18 from both opposing side-walls 28 of the plates 16. In an exemplary embodiment, the air diverters 32 are designed to catch moisture droplets and drain them to the reservoir 8 (see FIG. 1).

As shown in FIG. 2, in a preferred exemplary embodiment, plates 16 are formed as pairs folded about a vertical centerline 33. The folded plate approach eliminates the need to seal the vertical back edge of the dry passages 17 against leakage, as would be necessary if individual plates were joined along the back edge. Detailed forming of the plate top edges is necessary to separate the dry and wet passages 17, 18 and to maximize performance. The blower air 19 and the water enter the indirect stage 14 along the top edge of the plates 16. To close the top edges of the wet passages 18 along the rear zone where blower air 19 enters the dry passages 17, the plate edges have a double bend to form outward tapers 34 ending with vertical segments 35. Each segment 35 contacts a mating segment 35 from the adjacent plate 16. In an exemplary embodiment, the mating segment 35 may be secured by either plastic fusion, an adhesive, a tight-fitting cover channel, or the like (not shown). Transverse vertical segments 36 separate the dry passage inlet 24 zone from the wet passage inlet 25 zone, where inward tapers 37 end with vertical segments 38 that are similarly joined to close the dry passages 17.

Figure 3:
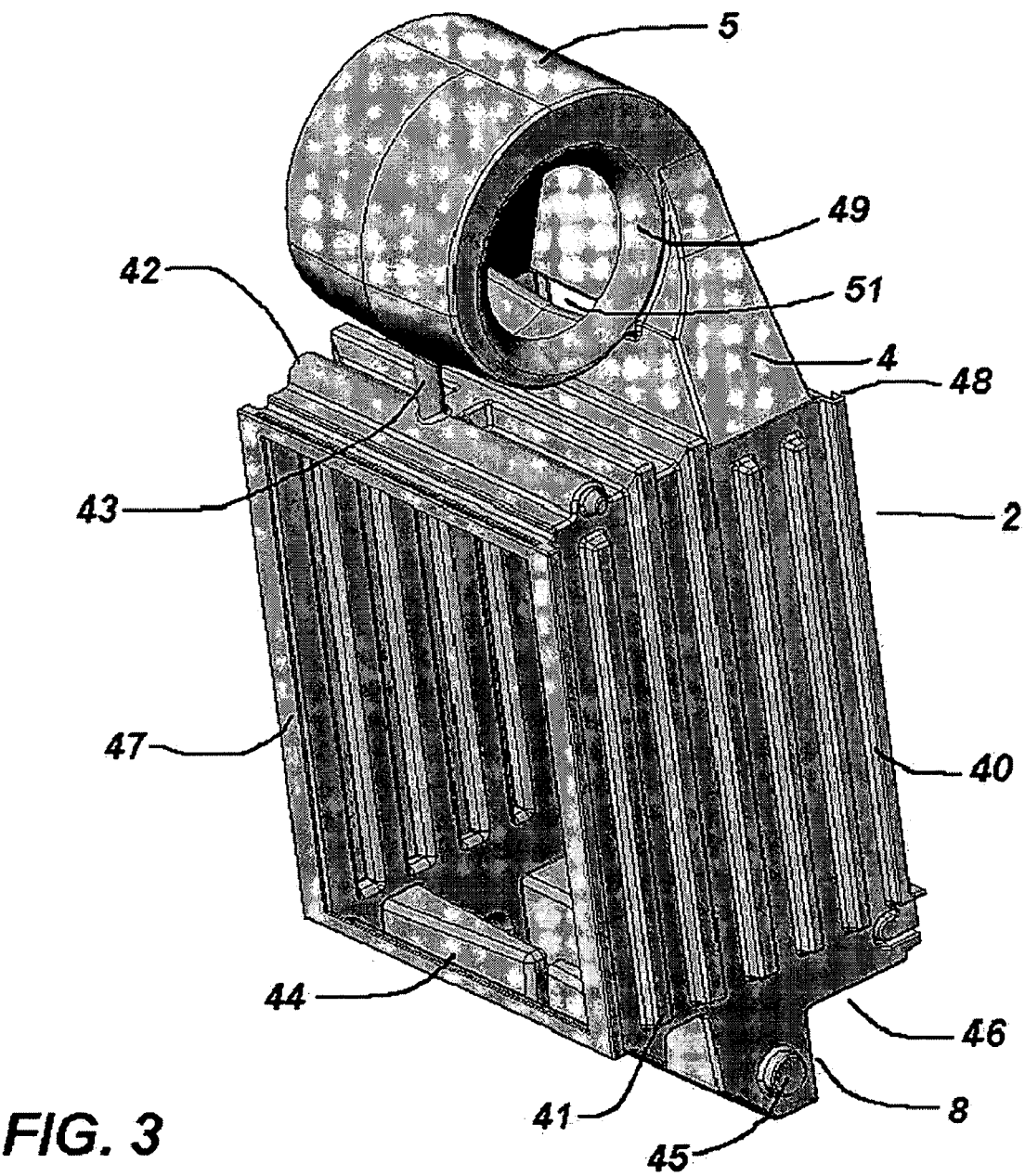
FIG. 3 is an isometric view of the molded cabinet for use with the indirect/direct cooling apparatus of FIG. 1.

FIG. 3 is an isometric view of a rotationally molded plastic cabinet 2 according to one preferred exemplary embodiment of the invention. The rotationally molded cabinet 2 significantly reduces assembly labor costs and eliminates cabinet corrosion. In the embodiment, the molded cabinet 2 includes an integrally molded centrifugal blower housing 5 to house the air mover 3, blower wheel 6 and electric motor 7 (FIG. 1). Blower venturi inlets 49 smooth the flow of fresh air entering the blower housing 5 through the inlet 51. An air discharge chute 4 allows the blower air 19 to exit the housing 5 into the indirect stage 14. The housing 40 houses the indirect and direct stages 14, 15, as well as the water reservoir 8. Structural ribs 41 may be added to the cabinet 2 to provide additional strength.

As shown in FIG. 3, the cabinet includes a recess 42 for housing a portion of the manifold 13 (FIG. 1), a blower housing support 43, and an indirect and direct cooling stage support 44. The indirect and direct cooling stage support 44 also facilitates water drainage into the reservoir 8. Support knobs 45 located at the base of the cabinet 2 provide a point to pivotally affix the unit to a mounting frame (not shown). The support knobs 45 allow the cabinet 2 to be rotated out of the frame to provide easy access during servicing. A pump recess 46 allows space for the pump 11 (FIG. 1) and other such components as may be desired. Vertical supply air discharge slots 47 can house a shutter (not shown) for use during cold weather. Vertical slots 48 at both sides of the exhaust face for the air stream 23 may hold (now shown) either a shutter or an insect screen.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, other combinations and configurations, including more, less, or only a single element, are also within the spirit and scope of the invention.

What is claimed is:

1. A two-stage evaporative cooling device, comprising:
an air mover for introducing air into the device;
a housing disposed below the air mover;
an indirect evaporative cooling stage disposed in the housing positioned downstream of the air mover, the indirect evaporative stage comprising a plurality of generally parallel vertical plates that define alternating dry passages and wet passages;

a direct evaporative cooling stage disposed in the housing and positioned adjacent to the indirect stage; and a water distribution system that provides water to wet the wet passages and the direct evaporative cooling stage, wherein air introduced by the air mover flows generally vertically from the air mover into the dry passages of the indirect stage and turns from vertical flow to horizontal flow in the dry passages, and when leaving the dry passages, divides into a first air stream that continues horizontally through the direct stage before exiting the device, and a second air stream that, when leaving the dry passages, flows back through the wet passages of the indirect evaporative stage before exiting the device.

2. The device of claim 1, wherein the plurality of plates are plastic plates having at least one spacer disposed thereon to maintain plate spacing between the plurality of plates.

3. The device of claim 2, wherein the plastic plates are formed on an inline thermoforming apparatus.

4. The device of claim 2, wherein the plurality of plates in the indirect evaporative cooling stage include at least one snap disposed thereon to secure adjacent plate walls to each other.

5. The device of claim 4, wherein the at least one spacer and the at least one snap are integrally thermoformed in the plates.

6. The device of claim 2, wherein each of the dry passages is enclosed by walls formed from a single plastic sheet that is folded along a vertical centerline to become a plate pair.

7. The device of claim 6, wherein at least two of the plate pairs are positioned in parallel vertical alignment and the wet passages are formed between the plate pairs.

8. The device of claim 1, wherein the dry passages include a plurality of vanes to induce air vertically entering the indirect evaporative cooling stage to exit the indirect evaporative cooling stage horizontally toward the direct stage.

9. The device of claim 8, wherein the plurality of vanes induce uniform airflow velocity along a height of the first air stream leaving the dry passages.

10. The device of claim 1, wherein water from the wet passages and water droplets from the second air stream are captured and recirculated through the device.

11. The device of claim 1, wherein the water distribution system comprises:

a water reservoir;

a pump that extracts water from the water reservoir;

at least one pipe connected to the pump to channel the water; and a manifold connected to the pipe for distributing the water to the wet passages and the direct evaporative cooling stage.

12. The device of claim 11, wherein the water distribution system is disposed within the housing.

13. The device of claim 11, wherein the manifold serving the wet passages is positioned laterally above the indirect stage and transverse to the parallel plates, and the manifold directs water into an opening in the plates corresponding to the wet passages.

14. The device of claim 13, wherein a trough is formed along a top edge of each of the wet passages, and wherein the trough distributes the water directed into the opening in the plates horizontally along substantially the entire length of each of the wet passages.

15. The device of claim 14, wherein each of the troughs is formed by opposed mating plate walls.

16. The device of claim 15, wherein each of the troughs includes a narrow slot at the bottom of each of the troughs to allow water to move downward into the wet passages, the slot being formed by an intersection of plate walls that are mated.

17. The device of claim 16, wherein the mating plate walls initially slope downward away from the intersection to facilitate downward water flow along the plate walls.

18. The device of claim 17, wherein the mating plate walls slope downward away from the intersection at an angle between about 25 degrees and about 35 degrees from vertical.

19. The device of claim 1, wherein the device is formed in a one-piece molded polymeric cabinet.

20. The device of claim 19, wherein the cabinet is rotationally molded.

21. The device of claim 1, wherein the air introduced from the air mover and a portion of the water from the water distribution system enter the indirect evaporative stage in separate zones along a top edge of the plates.

22. The device of claim 21, wherein the water enters the indirect evaporative stage in a zone adjacent the direct stage.

23. The device of claim 21, wherein the zones are separated by a divider formed in the plates.

24. The device of claim 23, wherein the dividers join alternating top edge segments of the plates and the top edge segments include a first taper to close the wet passages at a point where the air introduced from the air mover enters the indirect evaporative stage and a second taper to close the dry passages where the water enters the indirect stage.

25. The device of claim 24, wherein the top edge segments also include vertical edges above the first and second tapers to facilitate mating of adjacent top edges.

26. The device of claim 25, wherein the adjacent top edges are secured with rigid channels that hold the top edges in aligned contact.

27. The device of claim 26, wherein the adjacent top edges are fused.

28. The device of claim 1, wherein walls of the plates facing the wet passages are treated to facilitate the spreading of water over a surface of the walls.

29. The device of claim 28, wherein the plate walls are treated with a hydrophilic material adhered to the plate walls.

30. The device of claim 1, wherein the air mover is a variable speed air mover.

31. The device of claim 30, wherein the air mover changes speed in response to thermostatic commands.

32. The device of claim 1, further comprising a one-piece molded polymeric cabinet comprising integral housings for the air mover and the direct and indirect stages.

33. The device of claim 32, wherein the cabinet further comprises integral strengthening ribs.

34. The device of claim 32, wherein the cabinet further comprises an integral cavity for a water feed manifold for distributing water to the wet passages and the direct stage.

35. The device of claim 32, wherein the cabinet further comprises at least one integral support column from the air mover housing to the housing for the direct and indirect evaporative stages.

36. The device of claim 32, wherein the cabinet further comprises integral supports for evaporative media above a normal level of water in a reservoir disposed within the cabinet.

37. The device of claim 32, wherein the cabinet further comprises integral support knobs by which the device may be mounted to a support structure, wherein the knobs facilitate rotation of the cabinet about the knobs.

38. The device of claim 32, wherein the cabinet further comprises at least one integral recess for placement of at least one of a pump and a drain valve below a normal level of water in the reservoir.

39. The device of claim 32, wherein the cabinet further comprises at least one integral receiving slot for a winter closure shutter.

40. The device of claim 32, wherein the cabinet further comprises at least one integral receiving slot for a screen to prevent entry of insects and debris.

41. The device of claim 1, wherein the air mover housing includes at least one inlet venturi for smoothing the flow of air into the air mover.

* * * * *